United States Patent
Östrup et al.

(10) Patent No.: US 7,633,903 B2
(45) Date of Patent: Dec. 15, 2009

(54) PACKET DATA SUPPORT NODE AND METHOD OF ACTIVATING PACKET FLOW CONTEXTS DURING HANDOVER

(75) Inventors: Nils Peter Östrup, Linkoping (SE); John Diachina, Garner, NC (US); Gunnar Hedby, Sollentuna (SE); Anders Molander, Linköping (SE); Gunnar Rydnell, V Frölunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 526 days.

(21) Appl. No.: 11/382,643

(22) Filed: May 10, 2006

(65) Prior Publication Data

US 2007/0263591 A1    Nov. 15, 2007

(51) Int. Cl.
*H04W 4/00* (2009.01)
(52) U.S. Cl. .................... 370/331; 370/352
(58) Field of Classification Search ............ None
See application file for complete search history.

(56) References Cited

U.S. PATENT DOCUMENTS

| | | | |
|---|---|---|---|
| 6,987,779 B1 * | 1/2006 | Sevanto et al. | 370/469 |
| 2003/0231598 A1 * | 12/2003 | Venkataraman et al. | 370/252 |
| 2004/0085923 A1 * | 5/2004 | Qazi et al. | 370/328 |
| 2004/0248575 A1 * | 12/2004 | Rajala et al. | 455/436 |
| 2004/0266440 A1 * | 12/2004 | Fuchs et al. | 455/445 |
| 2005/0169207 A1 * | 8/2005 | Muniere | 370/328 |
| 2006/0104201 A1 * | 5/2006 | Sundberg et al. | 370/230 |
| 2006/0133315 A1 * | 6/2006 | Eriksson et al. | 370/331 |
| 2006/0268838 A1 * | 11/2006 | Larsson et al. | 370/352 |
| 2006/0268848 A1 * | 11/2006 | Larsson et al. | 370/356 |

FOREIGN PATENT DOCUMENTS

WO    WO-2005/125256    12/2005

OTHER PUBLICATIONS

3GPP-TS-43.129-v.6.7.1; Technical Specification; $3^{rd}$ Generation Partnership Project: Technical Specification Group GERAN; Packet-Switched Handover for GERAN A/Gb mode; Stage 2 (Release 6); http://www.3gpp.org/ftp/specs/html-info/43129-371.zip; Apr. 2006.

(Continued)

*Primary Examiner*—Phirin Sam (57) ABSTRACT

A method and packet data support node in a radio telecommunications network supporting packet data communication between a packet data network and a mobile terminal in radio communication with a first packet control unit. The packet data support node receives a message from the mobile terminal requesting handover to a second packet control unit. A packet flow context detector in the packet data support node detects the number of packet flow contexts currently active in the first packet control unit for supporting the packet data connection. The detector sends a message during handover to the second packet control unit indicating the number of active packet flow contexts. The message is used for activation of a corresponding number of packet flow contexts in the second packet control unit.

17 Claims, 4 Drawing Sheets

OTHER PUBLICATIONS

3GPP-TS-23.060-v6.11.0; Technical Specification; $3^{rd}$ Generation Partnership Project; Technical Specification Group Services and System Aspects; General Packet Radio Service (GPRS); Service Description; Stage 2 (Release 6); Dec. 2005.

GP-062416; Active PFCs in PS Handover Required; 3GPP-TSG-GERAN Meeting #32; Sophia Antipolis, France; Nov. 13-17, 2006; http://www.3gpp.org/ftp/tsg_ geran/TSG_GERAN/GERAN_32_Sophia_Antipolis/docs/GP-062416.zip.

* cited by examiner

PACKET DATA SUPPORT NODE AND METHOD OF ACTIVATING PACKET FLOW CONTEXTS DURING HANDOVER

CROSS-REFERENCE TO RELATED APPLICATIONS

NONE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to packet data handling in a radio communications network. More specifically, the present invention relates to efficient handover of a packet data connection in a radio telecommunications network.

In release 6 of the 3GPP specification, packet-switched (PS) handover was introduced within the GSM Evolved Radio Access Network (GERAN) and between GERAN and the Universal Mobile Telecommunication System (UMTS) Radio Access Network (UTRAN). In the following, GERAN will be used to illustrate the different technical aspects and problems; however these aspects and problems are also valid in UTRAN as well as in other radio telecommunications networks of similar structure.

In GERAN, a Base Station System (BSS), or more generally a radio base station, also known as a Radio Network Controller (RNC) in UTRAN, handles the radio connection to radio terminals. The BSS, or Packet Control Unit (PCU) for packet data, is also connected to a Serving General Packet Radio Service (GPRS) Support Node (SGSN) for transferring packets to and from the radio terminal.

The SGSN is further connected to a Gateway GPRS Support Node (GGSN), which in turn is connected to other packet networks. Thus a packet-switched connection can be established between the radio terminal on one end and a packet-switched service located in a packet-switched network on the other end. Furthermore, the SGSN and the GGSN may be connected to other network nodes such as a Home Location Register (HLR) and the like.

The interface between the BSS and the SGSN is called the Gb interface and is specified in the Technical Specification 3GPP TS 48.018. The interface between two different SGSN nodes or between the SGSN node and the GGSN node is the Gn interface specified in 3GPP 29.060.

When a radio terminal sets up a packet-switched connection towards an access point, a Packet Data Protocol (PDP) context is established in the SGSN connected to the PCU serving the radio terminal, and in the GGSN serving the access point to which the radio terminal wishes to establish a connection. The PDP context contains information about the subscriber such as the radio terminal, and session information such as the IP-address, International Mobile Subscriber Identity (IMSI), Quality of Service (QoS), and the like.

In the SGSN, a Packet Flow Context (PFC) is associated with each PDP context. The PFC contains, amongst other things, information relating to the Quality of Service (QoS) that the packet connection needs to support. Based on this information, the PCU allocates more time slots, and schedules a user with higher QoS more often than a user with lower QoS.

Since resources in the radio interface are limited, and since a PFC consumes such resources, it is important to release these resources as soon as possible when they are not used. To this end, the PCU deletes a PFC whenever it is inactive for a certain time to conserve radio resources. When the subscriber once again receives or transmits packet data, a new PFC for the particular PDP context is once again set up.

Thus, the PCU has a timer for each PFC which is reset for each received packet, and if the timer lapses, that is, if there is no activity for a particular PFC for some time, the PCU may delete that particular PFC to save radio resources. This deletion is not reported to the SGSN.

When handover of the radio terminal is required due to changing radio conditions, the SGSN instructs the target PCU to set up PFCs corresponding to all PDP contexts that are active. This includes those PFCs that the source PCU has inactivated or deleted, but for which the corresponding PDP context is alive, since the SGSN has no knowledge of which PFCs are currently active. This process results in a non-optimal resource utilization in the target PCU.

BRIEF SUMMARY OF THE INVENTION

It is an object of the present invention to provide an apparatus and method that at least alleviate the above-mentioned problems.

One object according to an aspect of the invention is to provide efficient resource utilization during handover of a packet-switched connection in a radio telecommunications system.

These objects among others are, according to one aspect of the present invention, attained by a method in a radio telecommunications network for performing handover of a mobile terminal having at least one packet-data connection. The handover is from a first packet control unit in a first serving GPRS support node to a second packet control unit. The method includes the steps of detecting in the SGSN, the number of packet flow contexts currently active in the first packet control unit for supporting the at least one packet data connection, and sending a message during handover to the second packet control unit indicating the number of active packet flow contexts. The message is used for activation of packet flow contexts in the second packet control unit to support the at least one packet data connection via the second packet control unit.

These objects among others are, according to another aspect of the present invention, attained by a packet data support node in a radio telecommunications network provided to support packet data communication between a packet data network and a mobile terminal. The mobile terminal is in radio communication with a first packet control unit. The packet data support node is provided to receive a message from the mobile terminal requesting handover to a second packet control unit.

The packet data support node includes a packet flow context detector provided to detect, in the packet data support node, the number of packet flow contexts currently active in the first packet control unit for supporting the at least one packet data connection. The detector is provided to send a message during handover to the second packet control unit indicating the number of active packet flow contexts. The message is used for activation of packet flow contexts in the second packet control unit to support the at least one packet data connection via the second packet control unit.

Only the radio base station (RBS), or more precisely the Packet Control Unit (PCU), is aware of which packet flow contexts are active. The PCU may inactivate or delete a packet flow context when it is deemed inactive. Since the packet flow context is associated with air interface resources, this is an important feature to conserve those resources. By detecting which packet flow contexts are inactivated or deleted in the packet data support node, the packet data support node may instruct the target packet control unit to only set up new packet flow contexts in the target packet control unit for the active packet flow contexts. Thus, resources are conserved in the target PCU.

According to one variant of an aspect of the invention, a message is received from the first packet control unit indicating the number of currently active packet flow contexts for the packet data connection when a handover is required. By sending a message from the PCU to the SGSN when a handover is initiated, comprising information regarding which packet flow contexts in the PCU are active, the SGSN can use this information to instruct the target PCU regarding which packet flow contexts to set up. The information may be sent in one message or in several independent messages.

According to one variant of an aspect of the invention, a packet flow timer is started in the first SGSN for each new packet flow context created in the first packet control unit. The packet flow timers are monitored to thereby detect the number of currently active packet flow contexts in the first packet control unit.

According to one variant of an aspect of the invention a packet flow timer is sent to the first packet control unit during the creation of a packet control unit packet flow context indicating the maximum inactivity time before the packet flow context is to be deleted in the first packet control unit. The packet flow timer is reset in the first packet control unit and the SGSN at each received packet, and the packet flow context is marked as deleted in the first SGSN when the packet flow timer lapse.

Since the SGSN knows when a packet flow context is initiated in the PCU, and the inactivation in the PCU is triggered by a timer, it is possible to also start a timer in the SGSN for each packet flow context. This timer is reset whenever packet data traffic occurs, and the lapse of the timer thus indicates that the PCU will inactivate the corresponding packet flow context.

According to one variant of an aspect of the invention the second packet control unit is connected to the first SGSN. The invention is thus applicable during handover between two packet control units connected to the same SGSN.

According to one variant of an aspect of the invention, the second packet control unit is connected to a second SGSN, and a message is sent from the first SGSN to the second SGSN indicating the detected number of active packet flow contexts. The invention is thus also applicable during handover between two packet control units connected to different SGSNs. The source SGSN then sends a message to the target SGSN comprising information regarding active packet flow contexts.

According to one variant of an aspect of the invention, the message from the first SGSN to the second SGSN is a PDP context information element message including information regarding whether an active packet flow context exists for this PDP context.

According to one variant of an aspect of the invention, the packet data connection comprises at least one PDP context, including a PDP address, and having an associated PFC.

Further characteristics of the invention and advantages thereof will be evident from the following detailed description of embodiments of the invention.

BRIEF DESCRIPTION OF THE SEVERAL VIEWS OF THE DRAWING

The present invention will become more fully understood from the detailed description of embodiments of the present invention given herein below and the accompanying drawings, which are given by way of illustration only, and thus are not limitative of the present invention.

DETAILED DESCRIPTION OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
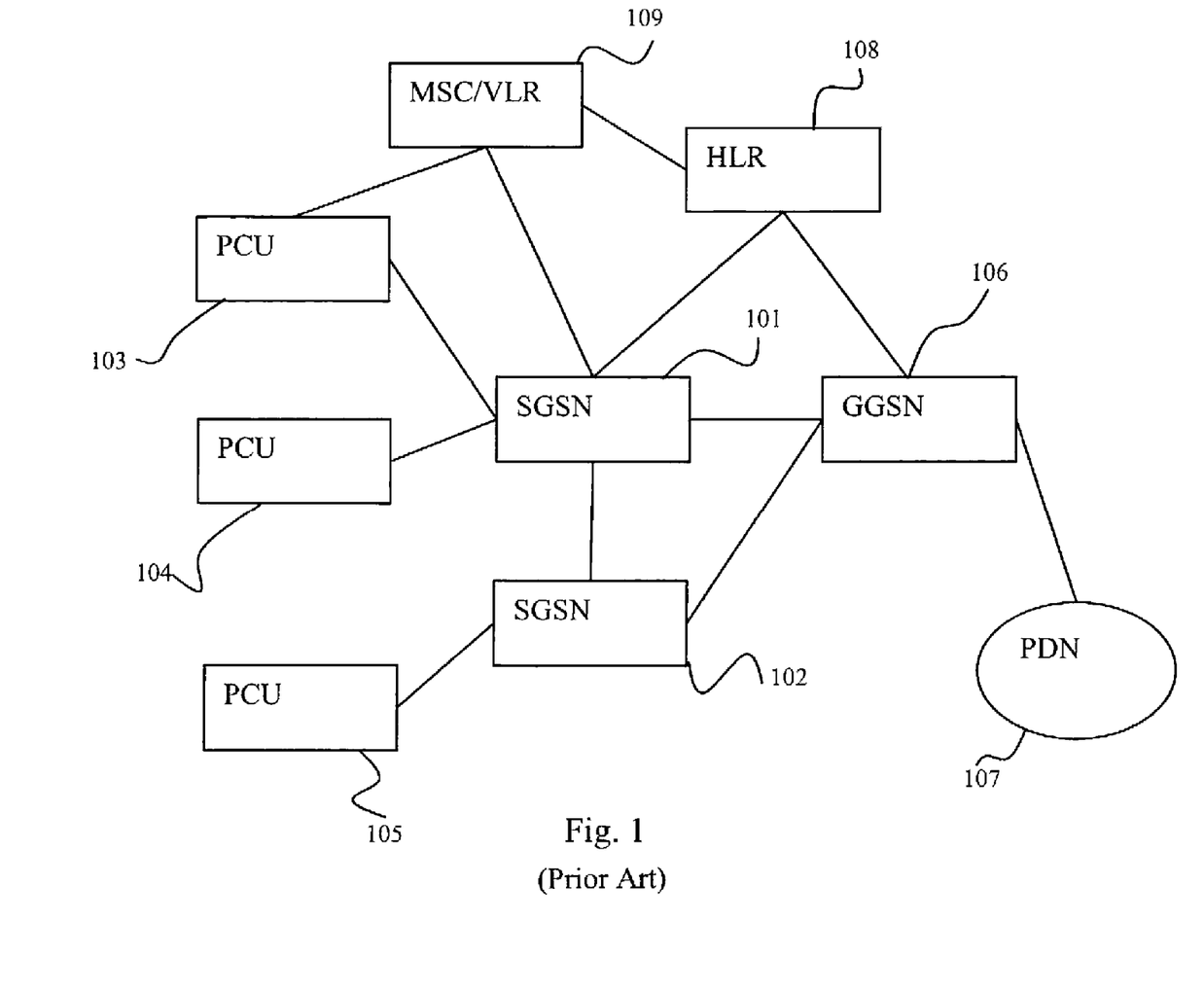
FIG. 1 (Prior Art) is a schematic block diagram of an existing GPRS network.

FIG. 1 is a schematic block diagram of an existing GPRS network. The network includes a first Serving GPRS support node (SGSN) 101 and a second SGSN 102. The first SGSN 101 is connected to a first and a second Packet Control Unit (PCU) 103 and 104, and the second SGSN 102 is connected to a third PCU 105.

The first and second SGSNs 101 and 102 are connected to a Gateway GPRS support node (GGSN) 106, which in turn is connected to a Packet Data Network (PDN) 107. Furthermore, a Home Location Register (HLR) 108 and a Mobile Switching Center/Visitor Location Register (MSC/VLR) 109 are illustrated.

Obviously, the illustrated system is limited, and an actual system may of course comprise a large number of different nodes of which only a few are illustrated in FIG. 1.

Figure 2:
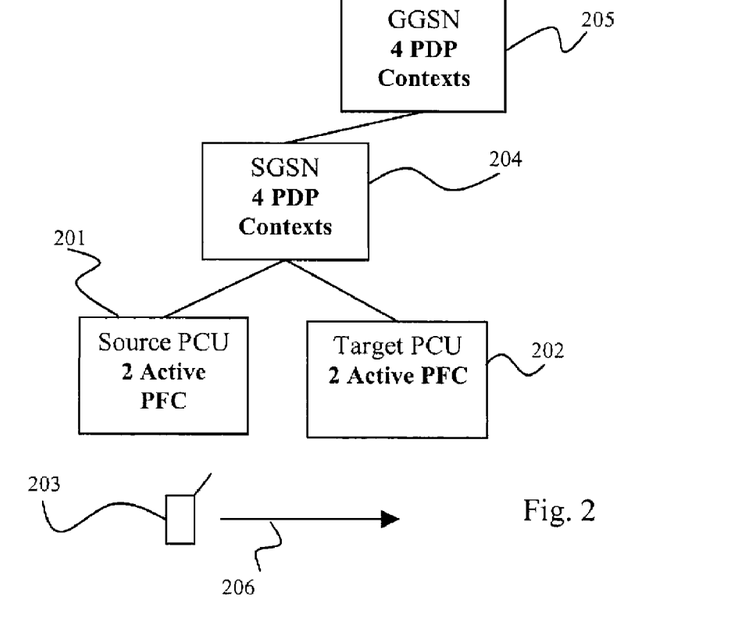
FIG. 2 is a schematic block diagram illustrating one aspect of the present invention.

FIG. 2 is a schematic block diagram illustrating a handover of a packet-switched data connection between a first source PCU 201 and a second target PCU 202 connected to a SGSN 204 according to the present invention. The SGSN is in turn connected to a GGSN 205 for further transport of packet data to a packet data network (not shown).

A mobile terminal 203 has four active PDP contexts established as is indicated in the SGSN 204. However, for two of these PDP contexts the corresponding PFC has been inactivated or deleted in the source PCU 201, and consequently only two PFCs are active in the source PCU.

The mobile terminal 203 moves, as is indicated by an arrow 206, from the source PCU 201 towards the target PCU 202, and thus a handover is required. The mobile terminal informs the SGSN 204 of the handover request in a message. The SGSN detects, as will be more closely disclosed below, whether any of the four PFCs corresponding to the four PDP contexts has been inactivated, and thus discovers that only two PFCs are still active.

The SGSN 204 thus instructs the target PCU 202, in the handover message, to only set up the two active PFCs. That will be enough to provide uninterrupted packet data communication, since the PDP contexts with inactivated PFCs have not had any traffic for a certain time period. Thus, the subscriber using the mobile terminal 203 experiences uninterrupted service during handover, while resources in the target PCU are conserved.

FIG. 2 illustrates the situation when the nodes are ready to execute the handover. The PFC in the source PCU 201 will be deleted after the handover has been executed.

Figure 3:
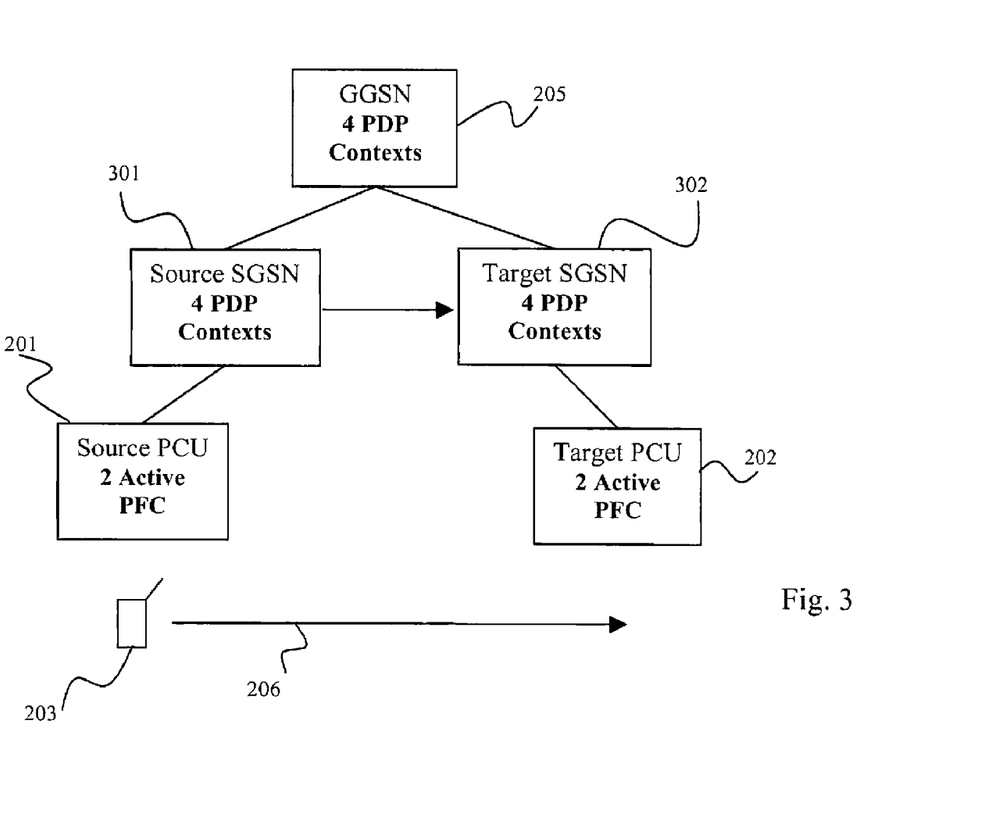
FIG. 3 is a schematic block diagram illustrating another aspect of the present invention.

FIG. 3 is a schematic block diagram according to another aspect of the invention. The main difference between this embodiment and the embodiment disclosed with reference to FIG. 2 is that the source and target PCUs are connected to different SGSN nodes. Corresponding components in FIG. 3 have been labeled with the same reference numerals as in FIG. 2.

Also in this example, the mobile terminal 203 has four active PDP contexts established as is indicated in a source SGSN 301. However, for two of these PDP contexts, the corresponding PFCs have been inactivated or deleted in the source PCU 201, and consequently only two PFCs are active in the source PCU. The source SGSN detects, as will be more closely disclosed below, whether any of the four PFCs corresponding to the four PDP contexts have been inactivated and thus discovers that only two PFCs are still active.

The source SGSN 301 sends, for each PDP context, a message to a target SGSN 302 instructing the target SGSN to set up a corresponding PDP context to support the packet data traffic to and from the mobile terminal 203. In each message, a flag is set indicating whether a corresponding PFC is active and thus is required to be set-up. In the illustrated case, only two of the PDP contexts comprise an active PFC, and thus the target SGSN only instructs the target PCU 202 to set up PFCs for these PDP contexts.

FIG. 3 illustrates the situation when the nodes are ready to execute the handover. The PFCs in the source PCU 201 and the PDP contexts in the source SGSN 301 will be deleted after the handover has been executed.

Figure 4:
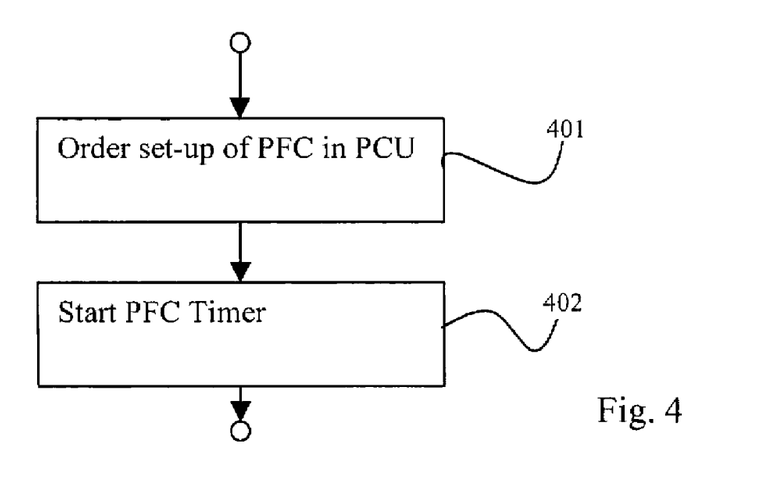
FIG. 4 is a schematic flow diagram according to one aspect of the present invention.

FIG. 4 is a schematic flow diagram of a method according to the invention to be executed in a SGSN node. At step 401, the method orders set up of a PFC in a PCU. At step 402, the SGSN starts a PFC timer to be used to detect whether a specific PFC is active or not, as will be described in connection with FIG. 5.

Figure 5:
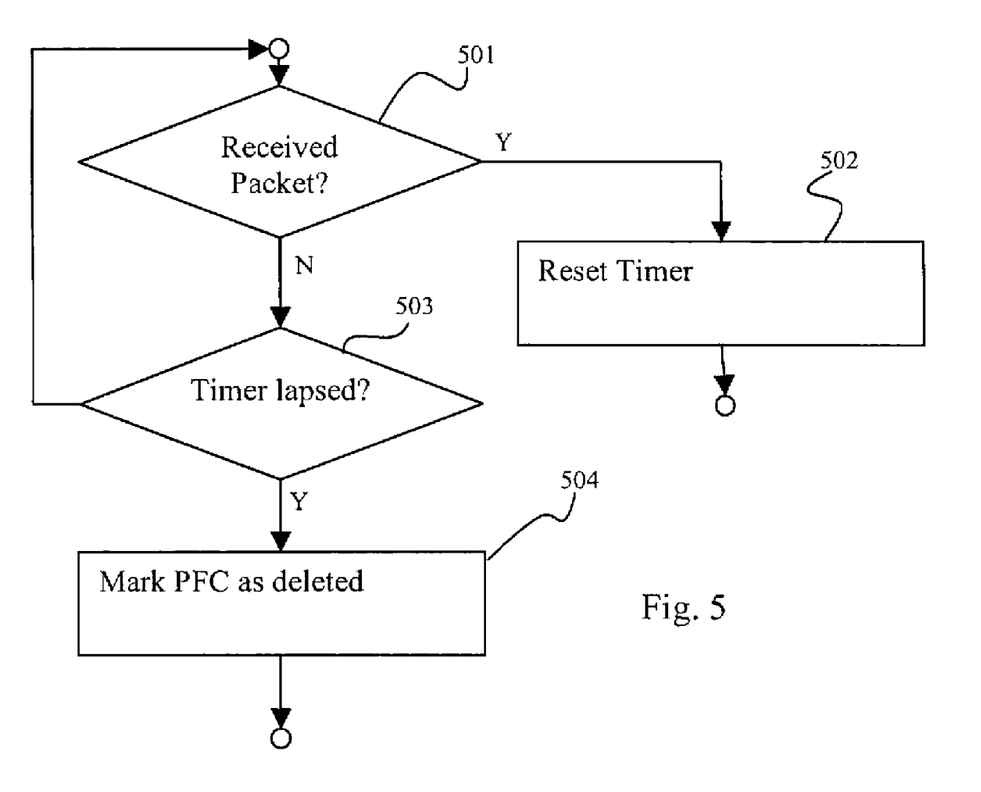
FIG. 5 is a schematic flow diagram according to anther aspect of the present invention.

FIG. 5 is a schematic flow diagram illustrating a method according to an aspect of the present invention in a simplified manner. At step 501, it is determined whether a packet is received. If so, the corresponding PFC timer is reset at step 502. If a packet is not received, the method moves to step 503 and determines whether the timer has lapsed. If the timer has not lapsed, the method returns to step 501 and waits for a packet to be received. If the timer has lapsed, the method moves to step 504 where the corresponding PFC is marked as deleted in the SGSN. Thus, the SGSN may detect which PFCs are still active.

Figure 6:
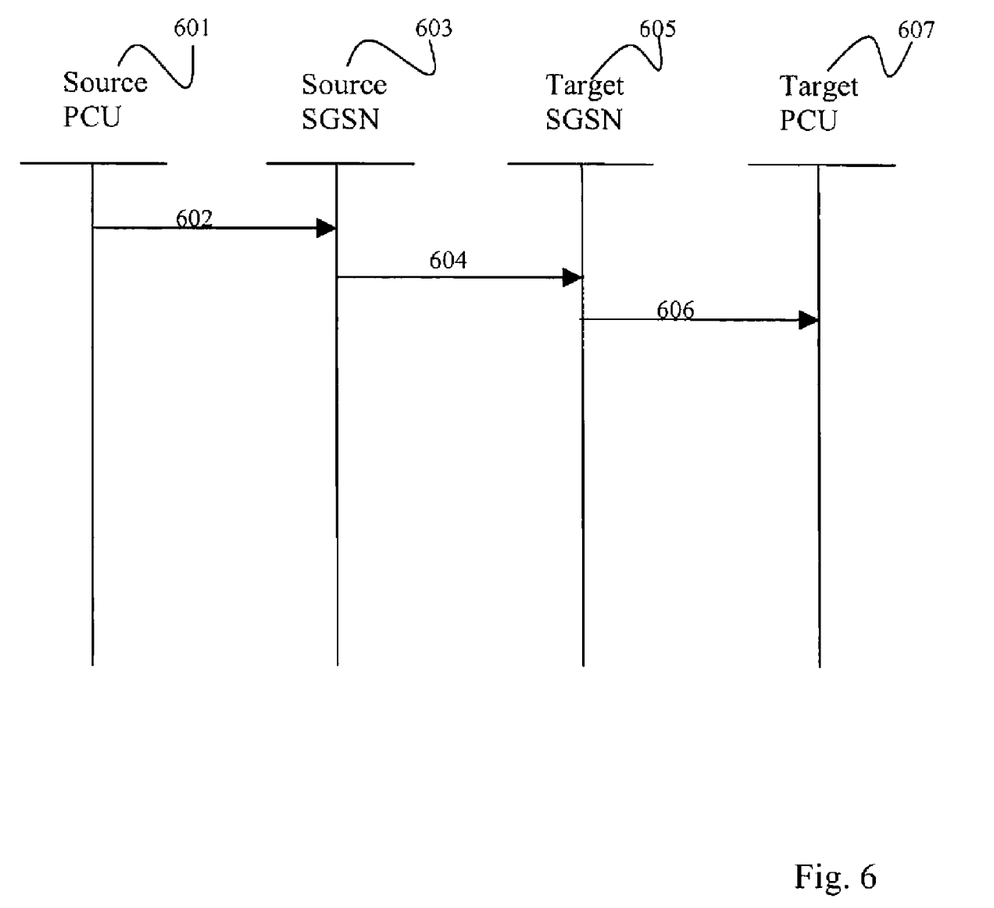
FIG. 6 is a schematic signalling diagram according to an alternative embodiment of the present invention.

FIG. 6 is a schematic signaling diagram according to one embodiment of the invention. At handover, a source PCU 601 sends a message 602 to the corresponding source SGSN 603 indicating which PFCs are active. The source SGSN 603, having several PDP contexts active, sends a message 604 to a target SGSN 605 ordering setup of the active PDP contexts.

The message 604 includes an indication of which PDP contexts have a corresponding active PFC. Thus, the target SGSN sends a message 606 to a target PCU 607 to set up the corresponding PFCs. Thus, four PDP contexts are set up in the target SGSN, but only two PFCs are set up in the target PCU.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed:

1. A method in a radio telecommunications network for performing handover of a mobile terminal having at least one packet data connection, wherein the mobile terminal is handed over between a first packet control unit connected to a first serving GPRS support node, SGSN, and a second packet control unit, the method comprising the steps of:
    detecting, in the first SGSN, the number of packet flow contexts currently active in the first packet control unit for supporting the at least one packet data connection; and
    sending a message during handover to the second packet control unit indicating the number of active packet flow contexts, the message being utilized for activation of packet flow contexts in the second packet control unit to support the at least one packet data connection via the second packet control unit.

2. The method according to claim 1, further comprising the step of:
    receiving a message from the first packet control unit indicating the number of currently active packet flow contexts for the packet data connection when a handover is required.

3. The method according to claim 1, further comprising the step of:
    starting a packet flow timer in the first SGSN for each new packet flow context created in the first packet control unit; and
    monitoring the packet flow timers in the first SGSN thereby detecting the number of currently active packet flow contexts in the first packet control unit.

4. The method according to claim 3, further comprising the step of:
    sending a packet flow timer to the first packet control unit during the creation of the packet control unit packet flow context indicating the maximum inactivity time before the packet flow context is to be deleted in the first packet control unit;
    resetting the packet flow timer in the first packet control unit and the first SGSN at each received packet; and
    marking the packet flow context as deleted in the first SGSN when the packet flow timer lapse.

5. The method according to claim 1, wherein the second packet control unit is also connected to the first SGSN.

6. The method according to claim 1, wherein the second packet control unit is connected to a second SGSN, and the method includes the step of:
    sending a message from the first SGSN to the second SGSN indicating the detected number of active packet flow contexts.

7. The method according to claim 6, wherein the message is sent at PS handover.

8. The method according to claim 6, wherein the message from the first SGSN to the second SGSN is a PDP context information element message including information regarding whether an active packet flow context exists for this PDP context.

9. The method according to claim 1, wherein the packet data connection comprises at least one PDP context, including a PDP address and having an associated PFC.

10. A packet data support node in a radio telecommunications network provided to support packet data communication between a packet data network and a mobile terminal being in radio communication with a first packet control unit, wherein the packet data support node is provided to receive a message from the mobile terminal requesting handover to a second packet control unit, said packet data support node comprising:

a packet flow context detector provided to detect, in the packet data support node, the number of packet flow contexts currently active in the first packet control unit for supporting the at least one packet data connection; and wherein the packet data support node is provided to send a message during handover to the second packet control unit indicating the number of active packet flow contexts, said message being utilized for activation of packet flow contexts in the second packet control unit to support the at least one packet data connection via the second packet control unit.

11. The packet data support node according to claim 10, wherein the packet flow context detector is provided by receiving a message from the first packet control unit indicating the number of currently active packet flow contexts for the packet data connection when a handover is required.

12. The packet data support node according to claim 10, wherein the packet flow context detector is a packet flow timer for each new packet flow context created in the first packet control unit.

13. The packet data support node according to claim 12, wherein the packet data support node is provided to:

send a packet flow timer to the first packet control unit during the creation of the packet control unit packet flow context, said timer indicating the maximum inactivity time before the packet flow context is to be deleted in the first packet control unit;

reset the packet flow timer in the first packet control unit and the SGSN at each received packet; and mark the packet flow context as deleted in the first SGSN when the packet flow timer lapses.

14. The packet data support node according to claim 10, wherein the second packet control unit is connected to the first SGSN.

15. The packet data support node according to claim 10, wherein the second packet control unit is connected to a second SGSN, and the packet data support node is provided to send a message from the first SGSN to the second SGSN indicating the detected number of active packet flow contexts.

16. The packet data support node according to claim 15, wherein the message from the first SGSN to the second SGSN is a PDP context information element message including information regarding whether an active packet flow context exists for this PDP context.

17. The packet data support node according to claim 10, wherein the packet data connection comprises at least one PDP context, including a PDP address and having an associated PFC.

* * * * *

UNITED STATES PATENT AND TRADEMARK OFFICE
CERTIFICATE OF CORRECTION

PATENT NO. : 7,633,903 B2  Page 1 of 1
APPLICATION NO. : 11/382643
DATED : December 15, 2009
INVENTOR(S) : Ostrup et al.

It is certified that error appears in the above-identified patent and that said Letters Patent is hereby corrected as shown below:

On the Title Page, in item (75), under "Inventors", in Column 1, Line 1, delete "Linkoping" and insert -- Linköping --, therefor.

On the Title Page, in item (75), under "Inventors", in Column 1, Line 3, delete "Sollentuna" and insert -- Spånga --, therefor.

In Column 4, Line 6, delete "DRAWING" and insert -- DRAWINGS --, therefor.

Signed and Sealed this

Twenty-third Day of March, 2010

David J. Kappos
*Director of the United States Patent and Trademark Office*